April 4, 1967 J. D. CUMMING 3,312,138
EXPANSION SHELL FOR ROCK BOLTS

Filed March 2, 1965 2 Sheets-Sheet 1

INVENTOR.
JAMES D. CUMMING
BY Maybee & Legris
ATTORNEYS

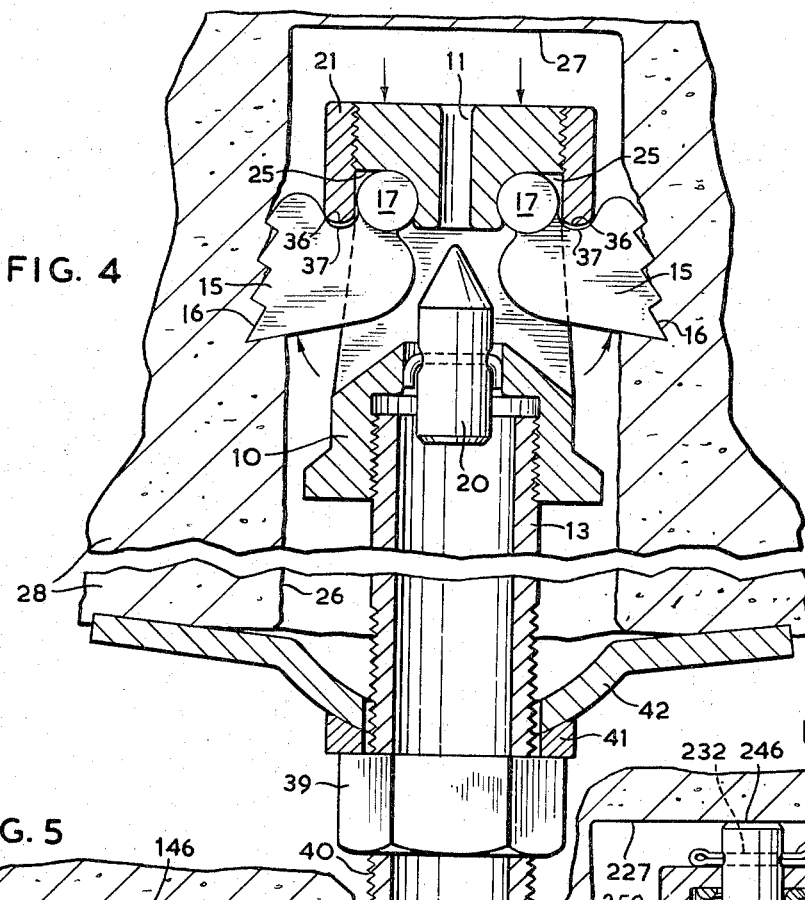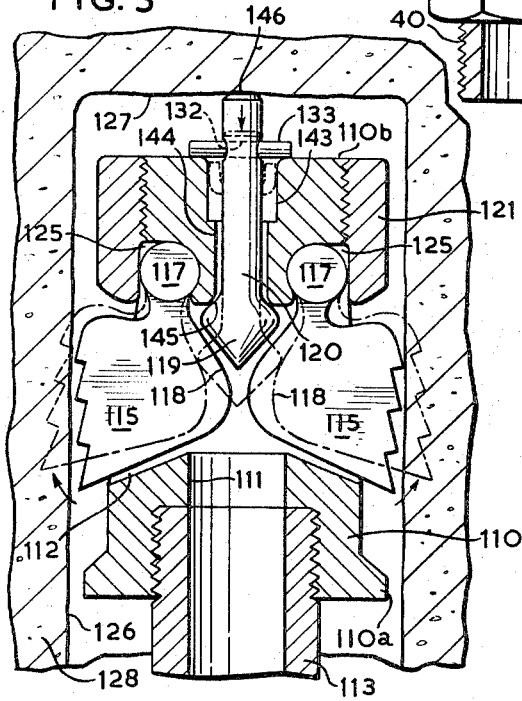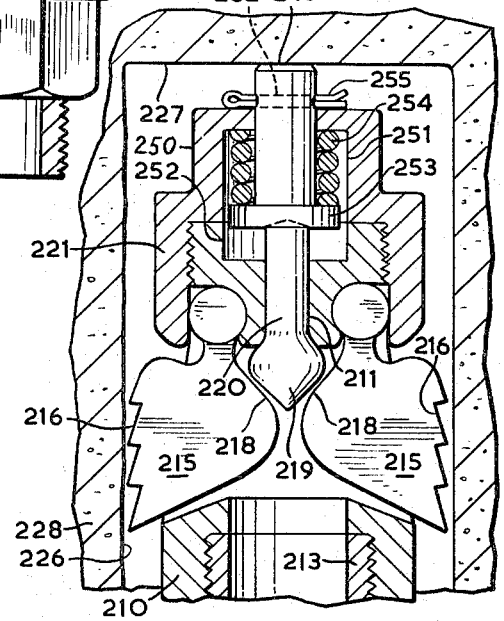
INVENTOR.
JAMES D. CUMMING
BY~ Maybee & Legris
ATTORNEYS United States Patent Office
3,312,138
Patented Apr. 4, 1967

3,312,138
EXPANSION SHELL FOR ROCK BOLTS
James D. Cumming, Havelock, Ontario, Canada
Filed Mar. 2, 1965, Ser. No. 436,617
4 Claims. (Cl. 85—66)

This invention relates to expansion shells and in particular to expansion shells of the kind that are used to secure the ends of bolts in blind holes drilled in rock, concrete, masonry and the like.

In constructing mine shafts and tunnels, masonry structures, rock cuts for road building and other purposes, it is frequently necessary to employ bolts which must be anchored at one end in blind holes in the rock or masonry. The prior art has developed many forms of expansion shells or bolt anchors for this purpose. These expansion shells generally include a plurality of serrated members which may be expanded outwardly by an internal wedge arrangement to grip the wall of the blind hole in the rock or masonry. Expansion shells of this kind, however, suffer from the defect that the wedge arrangement is capable of expanding the serrated members for only a limited amount. Accordingly, in soft rock it is possible and not uncommon for the wall of the blind hole to crumble under the expansion of the shell with the result that the bolt is not held securely.

It is an object of the present invention to provide an expansion shell which is specifically intended for use in soft rock.

It is a further object of the present invention to provide such an expansion shell in which the rock-gripping elements may be extended outwardly to a greater distance than has heretofore been generally possible in order to provide greater gripping power in soft rock.

It is a further object of the present invention to provide an expansion shell which, although not limited thereto, is particularly adapted for use in association with a hollow or tubular rock bolt of the kind described and claimed in the copending United States patent application of James D. Cumming, Ser. No. 410,524 entitled Grouted Rock Bolt and filed on Nov. 12, 1964.

The invention will be described in detail in conjunction with the appended drawings which illustrate three embodiments of the invention and in which:

FIGURE 4 is a view similar to FIGURE 3 showing the expansion shell as it might appear with full tension applied to the bolt by the illustrated arrangement of nut and washer;

FIGURE 5 is a longitudinal section of an expansion shell constituting a second embodiment of the present invention; and FIGURE 6 is a longitudinal section of an expansion shell constituting a third embodiment of the present invention.

Figure 1:
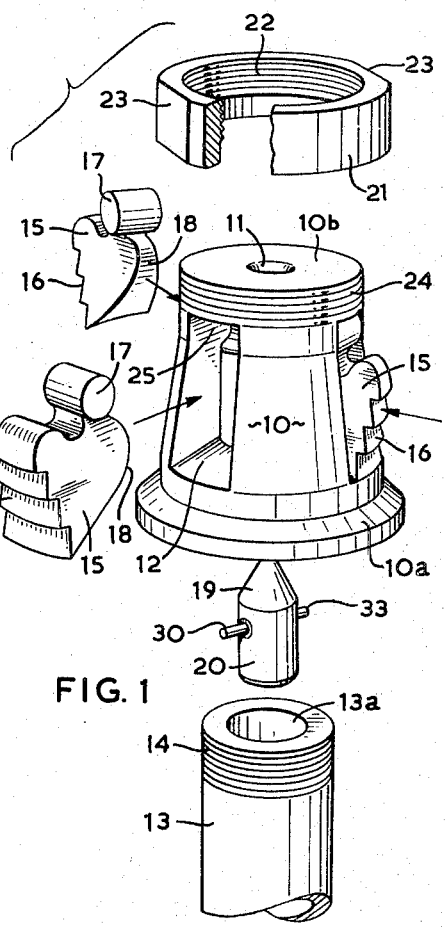
FIGURE 1 is a detailed exploded perspective view of an expansion shell embodying the present invention.

Of the drawings, only FIGURE 1 illustrates the expansion shell embodying three rock-engaging elements. However, three or even four rock-engaging elements are believed to be preferable to the two rock-engaging elements shown in FIGURES 2 to 6 inclusive and, accordingly, FIGURES 2 to 6 inclusive should be interpreted as being ilustrative of the invention rather than as limiting. The choice of illustrating only two rock-engaging elements was made in the interests of simplicity alone.

Referring now to the drawings and, in particular to FIGURE 1, the expansion shell may be seen to comprise a main body member 10 having an axial passage 11 and a plurality of apertures 12, in this case three apertures 12, equally spaced about its circumference. The body member 10 has an internally threaded bore (to be described in greater detail below) in its base 10a which may be attached to the end of a rock bolt 13 which, in turn, is externally threaded at 14.

A rock-engaging lug 15 is provided for each aperture 12, each lug having a serrated rock-engaging face 16, a socket-engaging element 17 and a shoulder or face 18 by means of which the lug may be engaged and moved by the cam surface 19 on a plunger 20 carried by the body 10 in the axial bore 11.

A retaining ring is internally threaded at 22 and provided with at least one pair of external opposed flat surfaces 23 by means of which it may be engaged by a wrench to thread it onto the top 10b of the body 10 which is externally threaded at 24.

The retaining ring 21, together with the outwardly opening recesses 25 at the ends of the apertures 12 remote from the bolt 13 define sockets adapted to receive the socket-engaging element 17 of the lugs 15 and to retain the lugs in the apertures 12 while permitting them to pivot in these sockets in an axial plane from a first position in which the lugs 15 are substantially within the apertures 12 to a second position in which the lugs 15 extend outwardly to engage the wall of a blind hole with their serrated rock-engaging faces 16.

Figure 2:
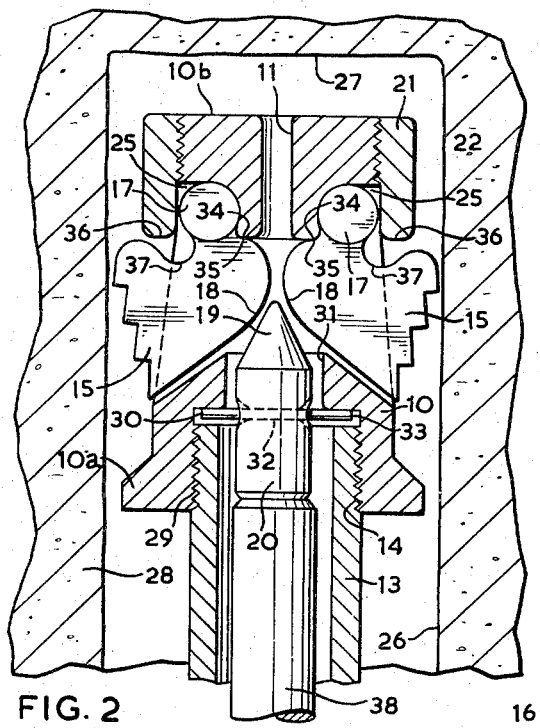
FIGURE 2 is a longitudinal section of an expansion shell embodying the present invention but having only two rock-engaging elements instead of the three rock-engaging elements shown in FIGURE 1.

Turning now to FIGURE 2, the invention is shown in axial section in position in a blind hole 26 having an end wall 27 drilled in rock or masonry 28. It is intended that the device of FIGURES 2, 3 and 4 be considered as if they were identical to the device of FIGURE 1 although, for convenience and simplicity, they have been drawn with only two rock-engaging lugs 15. In practice, one would normally expect to find three such lugs but, of course, the device may be made with only two rock-engaging lugs as shown, if desired.

In FIGURE 2, the body member 10 is shown in axial section and the base 10a may be seen to include an internally threaded bore 29 which is adapted to threadably engage the external threads 14 on the bolts 13 as has been previously described. The axial passage 11 through the body member 10 is of varying diameters, the largest diameter being that portion which is internally threaded at 29 in order to receive the bolts 13.

A shoulder 30 separates the portion of the bore 11 containing the threads 29 from a second portion 31 which is of smaller diameter and through which the plunger 20 passes with its cam surface 19 in a position such that it almost contacts the faces 18 of the rock-engaging lugs 15.

The plunger 20 is provided with a transverse bore 32 through which passes a pin 33. The pin 33 is of such a length that it extends beyond the plunger 20 on both sides and bears against the shoulder 30 to prevent the plunger 20 from moving in the direction of the rock-engaging lugs 15 unless it is deliberately and forcibly moved in this direction. Movement of the plunger 20 in the opposite sense of that axial direction is prevented by engagement between the pin 33 and the end of the bolt 13 which is threaded into the enlarged bore 11 of the body member 10.

As can also be seen in FIGURE 2, the rock-engaging lugs 15 which carry socket-engaging elements 17 are received in the socket formed by outwardly opening recesses 25 and are retained therein by the annular retaining ring 21. As shown, the retaining ring 21 is threadably engaged with the main body member 10 but, of course, it could simply be a ring which is slid over the body and then welded in position.

As shown in FIGURE 2, the lower internal edge 34 of the outwardly opening recess 25 constitutes a stop against which a shoulder 35 of the rock-engaging lug 15 may abut in order to define the first or inner retracted position of the rock-engaging lugs 15 which position is illustrated in FIGURE 2. The edge 36 of the retaining ring 21 constitutes a second stop adapted to be engaged by surface 37 of the rock-engaging lugs 15 to define the second, outer or extended position of the rock-engaging lugs 15 as will be seen from FIGURE 4.

As shown in FIGURE 2, the rock bolt 13 associated with the expansion shell is hollow or tubular having an axial bore 13a through which may be passed a steel rod or bar 38 for reasons which will became apparent below.

Figure 3:
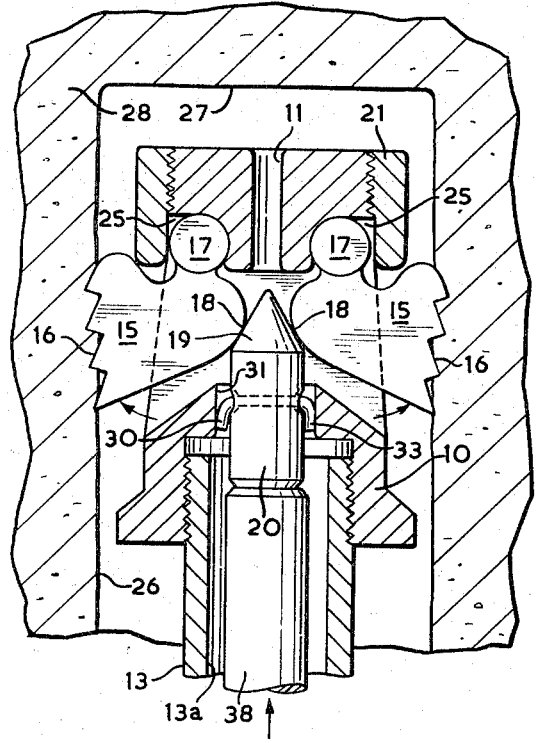
FIGURE 3 is a view similar to FIGURE 1 showing the plunger in the position in which it has moved the rock-engaging element outwardly to engage the wall of the blind hole.

Turning now to FIGURE 3, the expansion shell of FIGURE 2 is illustrated with the rock-engaging lugs 15 moved out of their first position towards their second position by the action of the cam surface 19 engaging surface 18 on the lugs. This has been achieved by forcibly driving the steel rod 38 axially along the bore 13a of the rock bolt 13 so as to strike the end of the plunger 20 with sufficient force to cause the pin 33 to be deformed and bent in a manner such that it, together with the plunger 20, has entered the bore 31. The diameter of the bore 31 adjacent the shoulder 30 against which the pin previously rested is sufficient to accommodate the entry of the plunger and the deformed pin in a manner which can be clearly seen. The pin 33 is of sufficient strength to prevent the unintentional movement or displacement of the plunger 20 from the position shown in FIGURE 2 to the position shown in FIGURE 3 but the deliberate and forcible impact of the rod 38 against the plunger 20 is sufficient to produce the result shown.

It will also be appreciated that once the plunger 20 and the deformed pin have entered the bore 31 as shown in FIGURE 3, the friction between the deformed pin 33 and the wall of the bore 31 will be sufficient to retain the plunger 20 in the position shown in FIGURE 3.

In FIGURE 3, the cam surface 19 having engaged the surfaces 18 on the rock-engaging lugs 15 has caused them to pivot outwardly in axial planes with the pivot points being within the sockets defined by the outwardly opening recesses 25 and the retaining ring 21. The socket-engaging elements 17 of the rock-engaging lugs 15 rotate within the socket so defined.

The movement of the plunger 20 under the impact of the rod 38 will be sufficient to cause the rock-engaging serrated faces 16 of the rock-engaging lugs 15 to come into contact with and, in the case of particularly soft rock, to "bite" into the rock as shown in FIGURE 3. In some instances, it may be necessary or desirable to reciprocate the rod 38 two or three times in order to strike the plunger 20 more than once so as to ensure that the rock-engaging lugs 15 have pivoted outwardly to a satisfactory degree. In most cases, it will be a simple matter to determine whether or not the rock-engaging lugs 15 have gripped the rock since if they have done so, it will be impossible to withdraw the bolt 13.

Turning now to FIGURE 4, the expansion shell is illustrated as it might appear under conditions of full tension of the rock bolt 13 which would be imposed thereon by tightening the internally threaded nut 39 on etxernal threads 40 provided at that end of the bolt 13 remote from the expansion shell. The nut 39 bears initially upon a hardened steel washer 41 which, in turn, bears upon a washer or bearing member 42 which lies upon the rock or masonary 28 surrounding the hole 26 bored therein.

The rod or bar 38 by means of which the plunger 20 was moved into its lug-engaging position has been withdrawn and the tension in the bolt 13 imposed by the tightening of the nut 39 has caused the rock-engaging lugs 15 to pivot still further about their socket-engaging element 17 received in the socket defined by the outwardly opening recesses 25 and the retaining ring 21. The rock-engaging serrated faces 16 have bitten more deeply into the soft rock 28 within which the hole 26 has been drilled and, as shown in FIGURE 4, the rock-engaging lugs 15 have reached the limit of their outward pivoting movement and are now locked against further movement by the engagement between surfaces 37 on each lug 15 and the edge 36 of the retaining ring 21.

From a consideration of FIGURES 1 to 4 inclusive it will be apparent that a rock-engaging expansion shell constructed in accordance with this invention will provide for extremely firm gripping power in soft rock.

In FIGURE 5, a slightly modified version of the expansion shell is illustrated. As in the embodiment illustrated in FIGURES 1 to 4, the embodiment of FIGURE 5 comprises a main body portion 110 having an axial passage 111 and a plurality of apertures equally spaced about is circumference in such a manner that a rock-engaging lug 115 may be received in each such aperture. Each rock-engaging lug 115 is provided with a socket-engaging element 117 adapted to be received in a socket defined by outwardly opening recesses 125 and a retaining ring 121.

In the embodiment illustrated in FIGURE 5, however, the plunger 120, instead of being located adjacent the base 110a of the body member 110 is located adjacent the top 110b of the body member in that portion of the aperture which is visible in FIGURE 1.

The axial passage 111 in the body member 110 adjacent the upper end 110b is of two sections, including an upper, somewhat enlarged bore 143 and a lower smaller bore 144. The plunger 120 is provided with an enlarged head having cam surfaces 119 and a shoulder 145 which prevents the plunger 120 from moving upwardly out of the passage within which it is contained. A transverse bore 132 carries a pin 133 which bears against the end 110b of the body member 110.

In order to install the embodiment of the invention illustrated in FIGURE 5, the bolt 113 together with the attached expansion shell is forcibly rammed into the hole 126 in the rock or masonry 128 until the end 146 strikes against the blind end 127 of the hole 126. This forcible and deliberate impact upon the end 146 of the plunger 120 will cause the pin 133 to be deformed so that the plunger 120 may move downwardly, carry the deformed pin 133 with it into the enlarged bore 143 and permit the cam surfaces 119 to engage the faces 118 of the rock-engaging lugs 115 to move them outwardly into initial engagement with the walls 126 of the hole in the rock 128.

Thereafter, the further installation of the bolt and the further movement of the lugs 115 in order to firmly grip the rock 128 is precisely as has already been described with reference to the embodiment of the invention illustrated in FIGURE 4.

In FIGURE 6, a slightly modified version of the embodiment shown in FIGURE 5 has been illustrated. In the embodiment of FIGURE 6, the retaining ring 221, while serving all of the functions which it served in the embodiments illustrated in FIGURES 1 to 4 inclusive and in FIGURE 5, also includes a hollow upper cap portion 250 which has an internal bore or cavity 251 which is co-axial with and the same diameter as an enlarged portion 252 of the axial passage 211 in the body portion 210 of the expansion shell.

The plunger 220 is, at its lower end, identical in construction to that illustrated and described with reference to FIGURE 5 but, at its upper end, it is provided with a radially extending peripheral flange 253 against which bears one end of a compression spring 254, the other end of which bears against the end wall of the internal cavity or bore 251 of the cap 250. The compression spring 254 tends to urge the plunger 220 towards the rock-engaging lugs 215 in order to spread them outwardly as has already been described. This movement is prevented, however, by a cotter pin or the like 255 which passes transversely through the plunger 220 in bore 232.

As was the case with respect to the embodiment described in association with FIGURE 5, the bolt 213 together with the attached expansion shell is deliberately and forcibly rammed upwardly into the hole 226 formed in the rock or masonry 228 until the end 246 of the plunger 220 contacts the blind end 227 of the hole 226.

The impact of the assembly against the blind end 227 of the hole 226 will shear off the protruding ends of the cotter pin 255 and the impact, together with the force of the compression spring 254 will drive the plunger 220 downwardly in order to spread the rock-engaging lugs 215 apart in order to extend them into their rock-engaging position.

In the embodiments illustrated with respect to FIGURES 1 to 4 inclusive and FIGURE 5, the plunger has been held in its lug-engaging position by the friction of the deformed pin in a somewhat oversize hole. In the embodiment of the invention illustrated in FIGURE 6, this function is served by the coil spring which, acting between the cap and the flange 253 will resiliently urge the plunger 220 into a position such that its cam surface 219 will engage faces 218 on the rock-engaging lugs 250.

Once initial engagement between the rock-gripping serrated faces 216 and the wall of the hole 226 has been achieved, the bolt 213 will then be tightened by the application of an appropriate nut bearing against an appropriate washer in a manner already described with reference to FIGURE 4.

From the above description it is believed apparent that the present invention provides an expansion shell which is specifically adapted for use in soft rock and which, due to the manner in which the rock-engaging lugs pivot outwardly, provides a greater gripping power for such an expansion shell in soft rock.

In addition, the expansion shell which has been described is, although not limited thereto, particularly compatible with a hollow or tubular rock bolt of the kind described and claimed in the copending application Ser. No. 410,524 which has been referred to above.

Although the invention has been described in particular detail with reference to its preferred embodiments, it is intended that the description and illustration of the invention be considered in an illustrative sense and that the scope of the invention be defined by the appended claims.

What I claim as my invention is:

1. An expansion shell to secure the end of a bolt in a blind hole comprising:
   a body member adapted to be secured to the end of a bolt in fixed and immovable relationship thereto;
   an axial passage through the body member;
   a plurality of apertures in the wall of the body member equally spaced about the periphery and communicating with the axial passage;
   an outwardly opening arcuate recess, at the end of each aperture remote from the bolt, the lower internal edge of said recess forming an inner stop shoulder of a socket;
   an annular retaining ring fixedly surrounding said body member and enclosing part of each recess with the edge of said ring defining an outer shoulder of a socket;
   a lug in each aperture adapted to engage the wall of the blind hole;
   a socket engaging element on each lug received in the corresponding socket of the corresponding aperture to pivotally mount each lug on the body member for it to pivot in an axial plane, said inner stop shoulder and said ring cooperating to maintain said socket engaging element within said socket in all positions of said lug;
   a first surface on each lug to engage the corresponding inner shoulder and define a first position wherein the lug is substantially within the aperture;
   a second surface on each lug to engage the corresponding outer shoulder and define a second position wherein the lug extends out of the aperture to engage the wall of the blind hole; and
   means carried by the body and axially movable relative thereto in the axial passage to engage the lugs to move them from their first position to their second position.

2. An expansion shell to secure the end of a bolt in a blind hole comprising:
   a body member adapted to be secured to the end of a bolt in fixed and immovable relationship thereto;
   an axial passage through the body member;
   at least two apertures in the wall of the body member equally spaced about its circumference and communicating with the axial passage;
   a lug in each aperture adapted to engage the wall of the blind hole;
   means pivotally mounting each lug on the body member for it to pivot in an axial plane from a first position in which the lug is substantially within the aperture to a second position wherein each lug extends out of the aperture to engage the wall of the blind hole;
   plunger means carried by the body and axially movable relative thereto in the axial passage, said plunger having cam surfaces to engage the lugs and, upon axial movement of the plunger towards the lugs, to move them from their first position to their second position; and
   a pin passing through a hole transverse to the plunger means and engaging a shoulder surrounding the axial passage to restrain the plunger from unintentional movement towards the lugs, said pin being capable of deformation to enter the axial passage upon deliberate and forcible movement of the plunger towards the lugs.

3. An expansion shell as claimed in claim 2 wherein the axial passage, adjacent the shoulder engaged by the pin is of a diameter sufficient to receive the plunger and the deformed pin.

4. An expansion shell as claimed in claim 2 wherein the axial passage is a sliding fit with the plunger adjacent the shoulder engaged by the pin and the pin is sheared by the edges of the shoulder upon deliberate and forcible movement of the plunger towards the lugs.

References Cited by the Examiner

UNITED STATES PATENTS

| 499,444 | 6/1893 | Scumann | 85—3 |
|---|---|---|---|
| 843,271 | 2/1907 | Hanlon | 85—66 |
| 883,833 | 4/1908 | Rossi | 85—3 |
| 929,979 | 8/1909 | Pleister | 85—66 |
| 1,003,527 | 9/1911 | Smith | 85—3 |
| 1,021,794 | 4/1912 | Pleister | 85—66 |
| 2,618,192 | 11/1952 | Temple | 85—65 |
| 2,669,887 | 2/1954 | Rees | 85—3 |
| 2,813,449 | 11/1957 | Barrett | 85—66 |
| 2,926,026 | 2/1960 | Matteson | 85—3 |
| 3,188,905 | 6/1965 | Millet | 85—84 |

FOREIGN PATENTS

| 853,514 | 10/1952 | Germany. |
|---|---|---|
| 218,073 | 7/1924 | Great Britain. |
| 553,142 | 5/1943 | Great Britain. |

CARL W. TOMLIN, *Primary Examiner.*

EDWARD C. ALLEN, *Examiner.*

M. PARSONS, *Assistant Examiner.*